(12) United States Patent
Isii et al.

(10) Patent No.: US 11,121,373 B2
(45) Date of Patent: Sep. 14, 2021

(54) METHOD FOR MANUFACTURING ELECTROCHEMICAL DEVICE, AND ELECTROCHEMICAL DEVICE

(71) Applicant: Panasonic Intellectual Property Management Co., Ltd., Osaka (JP)

(72) Inventors: Kiyohiro Isii, Osaka (JP); Takuma Asari, Hyogo (JP); Chiho Nobumori, Hyogo (JP); Yasuyuki Ito, Osaka (JP); Nao Matsumura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 404 days.

(21) Appl. No.: 15/924,289

(22) Filed: Mar. 19, 2018

(65) Prior Publication Data
US 2018/0212245 A1  Jul. 26, 2018

Related U.S. Application Data

(63) Continuation of application No. PCT/JP2016/004275, filed on Sep. 20, 2016.

(30) Foreign Application Priority Data

Sep. 28, 2015 (JP) .............................. JP2015-189602

(51) Int. Cl.
*H01M 4/60* (2006.01)
*H01M 4/137* (2010.01)
(Continued)

(52) U.S. Cl.
CPC ............ *H01M 4/606* (2013.01); *H01G 11/06* (2013.01); *H01G 11/48* (2013.01); *H01G 11/50* (2013.01);
(Continued)

(58) Field of Classification Search
CPC .... H01M 4/606; H01M 4/137; H01M 4/1399; H01M 10/0568; H01M 10/0585;
(Continued)

(56) References Cited

U.S. PATENT DOCUMENTS 4,865,932 A    9/1989  Masuda et al.
2014/0178718 A1  6/2014  Kano
(Continued)

FOREIGN PATENT DOCUMENTS

CN    102005611 A    4/2011
CN    103765657 A    4/2014
(Continued)

OTHER PUBLICATIONS

International Search Report of PCT application No. PCT/JP2016/004275 dated Nov. 1, 2016.
(Continued)

*Primary Examiner* — Osei K Amponsah
(74) *Attorney, Agent, or Firm* — McDermott Will and Emery LLP

(57) ABSTRACT

A method for manufacturing an electrochemical device includes the following steps: a step of preparing a positive electrode, the positive electrode including a first current collector and a positive electrode layer containing a conductive polymer; a step of preparing a negative electrode, the negative electrode including a second current collector and a negative electrode layer; and a step of sealing the positive electrode, the negative electrode, and an electrolytic solution in an exterior body. The step of preparing the positive electrode includes a step of holding the positive electrode in depressurized atmosphere and then introducing gas containing $CO_2$ as a primary component into the depressurized atmosphere.

9 Claims, 6 Drawing Sheets

(51) Int. Cl.
    *H01M 4/1399*     (2010.01)
    *H01M 10/0525*     (2010.01)
    *H01M 10/0568*     (2010.01)
    *H01M 10/0585*     (2010.01)
    *H01G 11/06*     (2013.01)
    *H01G 11/48*     (2013.01)
    *H01G 11/50*     (2013.01)
    *H01G 11/86*     (2013.01)
    *H01M 10/0566*     (2010.01)
    *H01M 10/058*     (2010.01)
    *H01M 10/052*     (2010.01)
    *H01G 11/82*     (2013.01)
    *H01G 11/58*     (2013.01)
    *H01G 11/66*     (2013.01)
    *H01M 4/02*     (2006.01)

(52) U.S. Cl.
    CPC ............. *H01G 11/58* (2013.01); *H01G 11/66* (2013.01); *H01G 11/82* (2013.01); *H01G 11/86* (2013.01); *H01M 4/137* (2013.01); *H01M 4/1399* (2013.01); *H01M 4/60* (2013.01); *H01M 10/052* (2013.01); *H01M 10/058* (2013.01); *H01M 10/0525* (2013.01); *H01M 10/0566* (2013.01); *H01M 10/0568* (2013.01); *H01M 10/0585* (2013.01); *H01M 2004/028* (2013.01); *H01M 2300/0025* (2013.01); *Y02E 60/13* (2013.01); *Y02T 10/70* (2013.01)

(58) Field of Classification Search
    CPC . H01M 2004/028; H01G 11/86; H01G 11/48; H01G 11/58; H01G 11/06; H01G 11/50; H01G 11/66
    See application file for complete search history.

(56) References Cited

U.S. PATENT DOCUMENTS

| | | | |
|---|---|---|---|
| 2014/0220438 A1* | 8/2014 | Abe | H01M 4/606 429/213 |
| 2015/0146346 A1* | 5/2015 | Shimomura | H01G 11/06 361/502 |
| 2015/0357642 A1* | 12/2015 | Xing | H01M 4/505 252/182.1 |

FOREIGN PATENT DOCUMENTS

| | | |
|---|---|---|
| EP | 2728659 A1 | 5/2014 |
| EP | 2876709 A1 | 5/2015 |
| JP | 1-112658 | 5/1989 |
| JP | 2014-123641 | 7/2014 |
| WO | 2007/088604 | 8/2007 |

OTHER PUBLICATIONS

The Extended European Search Report dated Nov. 7, 2018 for the related European Patent Application No. 16850631.9.
English Translation of Chinese Search Report dated Jun. 29, 2020 for the related Chinese Patent Application No. 201680055732.8.

* cited by examiner

METHOD FOR MANUFACTURING ELECTROCHEMICAL DEVICE, AND ELECTROCHEMICAL DEVICE

RELATED APPLICATIONS

This application is a continuation of the PCT International Application No. PCT/JP2016/004275 filed on Sep. 20, 2016, which claims the benefit of foreign priority of Japanese patent application No. 2015-189602 filed on Sep. 28, 2015, the contents all of which are incorporated herein by reference.

TECHNICAL FIELD

The present disclosure relates to an electrochemical device using a lithium ion, and a method for manufacturing the electrochemical device.

BACKGROUND

In a known electrochemical device using a lithium ion, a conductive polymer is used as a material of a positive electrode, and a carbon material in which a lithium ion is occluded is used as a material of a negative electrode. During the time of charging such an electrochemical device, a lithium ion in an electrolytic solution is occluded in the negative electrode, and an anion in the electrolytic solution is to be doped into the positive electrode. During the time of discharging, a lithium ion is released from the negative electrode into the electrolytic solution, and an anion is undoped from the positive electrode into the electrolytic solution. Accordingly, in a charging and discharging cycle, the negative electrode uses a lithium ion, and the positive electrode uses an anion (see, Unexamined Japanese Patent Publication No. 2014-123641, International Publication No. WO 2007/88604, Unexamined Japanese Patent Publication No. H01-112658, for example).

SUMMARY

A method for manufacturing an electrochemical device according to a first aspect of the present disclosure includes the steps of: producing a positive electrode in which a positive electrode layer containing a conductive polymer is formed on a first current collector; producing a negative electrode in which a negative electrode layer containing a material configured to occlude and release a lithium ion is formed on a second current collector; producing a laminated body in which a separator is interposed between the positive electrode and the negative electrode; and sealing the laminated body together with an electrolytic solution in an exterior body. The step of producing the positive electrode includes a step of holding the positive electrode in depressurized atmosphere and then introducing gas containing $CO_2$ as a primary component into the depressurized atmosphere.

A method for manufacturing an electrochemical device according to a second aspect of the present disclosure includes the steps of: producing a positive electrode in which a positive electrode layer containing a conductive polymer is formed on a first current collector; producing a negative electrode in which a negative electrode layer containing a material configured to occlude and release a lithium ion is formed on a second current collector; producing a laminated body in which a separator is interposed between the positive electrode and the negative electrode; and sealing the laminated body together with an electrolytic solution in an exterior body. The step of producing the laminated body includes a step of holding the laminated body in depressurized atmosphere and then introducing gas containing $CO_2$ as a primary component into the depressurized atmosphere.

An electrochemical device according to a third aspect of the present disclosure includes: a positive electrode in which a positive electrode layer containing a conductive polymer is formed on a first current collector; a negative electrode in which a negative electrode layer containing a material having an occluded lithium ion is formed on a second current collector; a separator interposed between the positive electrode and the negative electrode; and an electrolytic solution containing a lithium ion and an anion. An absorption spectrum for the positive electrode layer which is measured by infrared spectroscopy has a profile that a ratio $(A_{800}/A_{max})$ of an absorbance $(A_{800})$ at 800 $cm^{-1}$ to a proximity peak absorbance $(A_{max})$ near 800 $cm^{-1}$ is greater than 0.30, a ratio $(B_{1085}/B_{max})$ of an absorbance $(B_{1085})$ at 1085 $cm^{-1}$ to a proximity peak absorbance $(B_{max})$ near 1085 $cm^{-1}$ is greater than 0.21, and a ratio $(C_{1340}/C_{max})$ of an absorbance $(C_{1340})$ at 1340 $cm^{-1}$ to a proximity peak absorbance $(C_{max})$ near 1340 $cm^{-1}$ is greater than 0.70.

A proximity peak means an absorption peak having maximum absorbance among absorption peaks appearing near each wavelength (800 $cm^{-1}$, 1085 $cm^{-1}$, 1340 $cm^{-1}$) in an absorption spectrum measured by infrared spectroscopy. The occlusion and release of a lithium ion mean reversible entering of a lithium ion into between multiple layers of a crystal structure of the carbon material.

According to the present disclosure, an electrochemical device capable of suppressing a capacitance decrease, an internal resistance increase, and gas generation, and having improved reliability can be easily obtained.

DESCRIPTION OF EMBODIMENT

Prior to describing exemplary embodiments of the present disclosure, problems in a conventional electrochemical device are described.

In such an electrochemical device using a lithium ion, water inside the electrochemical device affects, for example, a capacitance and an internal resistance at the time of charging and discharging. Thus, it has been considered that, when an electrode using a conductive polymer as the positive electrode material is manufactured, the amount of contained water in the electrode is reduced by, for example, vacuum dry or immersion dehydration. The vacuum dry is holding the electrode in depressurized atmosphere for a predetermined time. The immersion dehydration is immersing the electrode in a non-aqueous solution containing almost no water.

However, an electrochemical device using a positive electrode containing a conductive polymer provided with the process of reducing water as described above does not exhibit a sufficient battery characteristic, and thus, is required to achieve improved reliability.

The present disclosure is intended to solve the above-described problem, and provides an electrochemical device having an excellent battery characteristic and improved reliability, and a method for manufacturing the electrochemical device.

An exemplary embodiment of the present disclosure will be described below.

Figure 1:
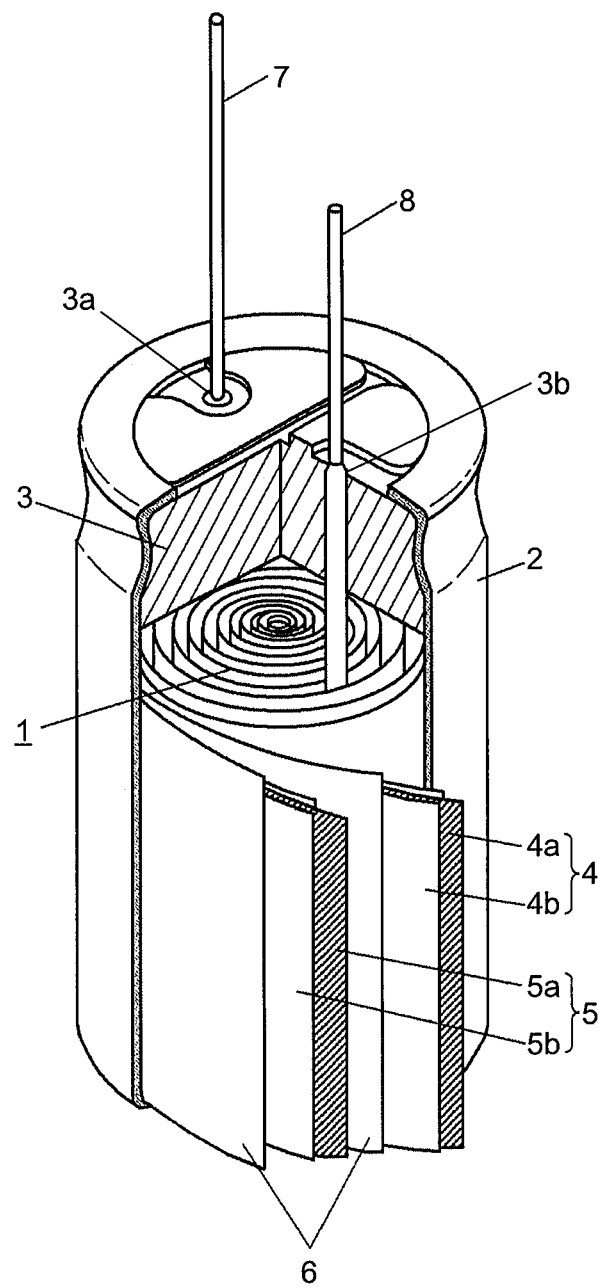
FIG. 1 is a partially cutout perspective view of an electrochemical device according to an exemplary embodiment of the present disclosure.

FIG. 1 is a partially cutout perspective view of an electrochemical device according to an exemplary embodiment of the present disclosure. In the electrochemical device according to the present exemplary embodiment, electrochemical element 1 is housed together with an electrolytic solution (not illustrated) inside exterior body 2 having a bottomed tubular shape and made of, for example, aluminum (Al). Sealing member 3 made of, for example, rubber is inserted in an opening end of exterior body 2. And drawing fabrication and curling fabrication are provided with the opening end of exterior body so as to achieve sealing of inside. Electrochemical element 1 is an example of laminated body according to the present disclosure.

The electrolytic solution is a mixture of an electrolyte such as $LiPF_6$, and a solvent obtained by mixing propylene carbonate (PC) and dimethyl carbonate (DMC) at a weight ratio of 1:1. In this case, a lithium ion ($Li^+$) and $PF_6^-$ exist in the electrolytic solution, and $PF_6^-$ is an example of anion according to the present disclosure.

Electrochemical element 1 has a configuration in which positive electrode 4 and negative electrode 5 are wound with separator 6 made of, for example, cellulose interposed between positive electrode 4 and negative electrode 5. In positive electrode 4, positive electrode layer 4b made of, for example, polyaniline is formed on front and back surfaces of current collector 4a made of, for example, Al foil. In negative electrode 5, negative electrode layer 5b containing non-graphitizable carbon (hard carbon) is formed on front and back surfaces of current collector 5a made of, for example, copper (Cu) foil. Positive electrode 4 and negative electrode 5 are connected with lead wires 7, 8, respectively. Lead wires 7, 8 are externally extended through through-holes 3a, 3b provided in sealing member 3. Current collectors 4a, 5a are examples of first and second current collectors, respectively, according to the present disclosure. The polyaniline and hard carbon are an example of conductive polymer and an example of carbon material, respectively, according to the present disclosure.

Next, a process of manufacturing the electrochemical device according to the present exemplary embodiment will be described.

Positive electrode 4 (positive electrode layer 4b) is formed by depositing polyaniline directly on current collector 4a through electrolytic polymerization. Accordingly, positive electrode layer 4b contains no conduction agent or no binding agent.

After depositing the polyaniline on current collector 4a, a drying step (first drying step) of removing water adsorbed in the polyaniline is performed. Specifically, positive electrode 4 is held in depressurized atmosphere for a predetermined time (vacuum-dried). Thereafter, at returning to normal pressure, gas containing carbon dioxide ($CO_2$) as a primary component is introduced (purged) into the depressurized atmosphere.

Negative electrode 5 is formed by applying a carbon paste onto current collector 5a and drying the carbon paste. The carbon paste was produced by kneading, with water, the hard carbon and, for example, a conduction agent and a binding agent. Accordingly, negative electrode layer 5b contains, for example, the conduction agent and the binding agent.

In addition, a lithium thin film is formed on negative electrode layer 5b by, for example, vacuum evaporation coating. The formation allows lithium pre-doping to be described later.

After positive electrode layer 4b and negative electrode layer 5b are formed, each of positive electrode layer 4b and negative electrode layer 5b is partially removed so as to expose respective part of current collectors 4a, 5a. And then lead wires 7, 8 are joined to exposed surfaces of current collectors 4a, 5a by, for example, resistance welding or ultrasonic welding.

Water adsorbed in separator 6 is removed by holding separator 6 in depressurized atmosphere at a temperature heated up to approximately 100° C. for a predetermined time. Thereafter, an atmosphere surrounding separator 6 is returned to normal pressure by purging dry air into the depressurized atmosphere at room temperature.

Thereafter, positive electrode 4, separator 6, negative electrode 5, and separator 6 are laminated in this order so that positive electrode layer 4b and negative electrode layer 5b face to each other with separator 6 interposed between positive electrode layer 4b and negative electrode layer 5b. The laminated body is then wound from an end part so that positive electrode 4 is positioned on an inner side, thereby forming electrochemical element 1.

Subsequently, electrochemical element 1 is inserted into exterior body 2, and then another drying step (second drying step) is performed. Similarly to the above-described first drying step, the second drying step is performed by holding electrochemical element 1 and exterior body 2 in depressurized atmosphere for a predetermined time. Thereafter, an atmosphere surrounding electrochemical element 1 and exterior body 2 is returned to normal pressure by purging gas containing $CO_2$ as a primary component.

After that, exterior body 2 is filled with the electrolytic solution, and the entire electrochemical element 1 is impregnated with the electrolytic solution by holding exterior body 2 filled with the electrolytic solution in depressurized atmosphere.

Lastly, an atmosphere surrounding exterior body 2 is returned to normal pressure by purging dry air into the depressurized atmosphere. Thereafter, while lead wires 7, 8 are inserted in the respective through-holes 3a, 3b, sealing member 3 is inserted into exterior body 2 from the opening end side. And a vicinity of an opening end of exterior body 2 is provided with drawing fabrication and curling fabrication so as to seal the inside. Accordingly, the electrochemical device according to the present exemplary embodiment is produced.

As described above, in the present exemplary embodiment, gas containing $CO_2$ as a primary component is purged when the depressurized atmosphere in which positive electrode 4 and electrochemical element 1 are held is returned to normal pressure in the first drying step and the second drying step. Accordingly, in each of the first and second drying steps, water contained in the conductive polymer (polyaniline) in positive electrode layer 4b is removed, and $CO_2$ is adsorbed into the surface of positive electrode layer 4b. As described later, the inventors of the present disclosure have found that the occurrence of capacitance degradation and internal resistance increase in a float test can be suppressed by performing the first and second drying steps.

Although a mechanism of such an effect according to the present disclosure is not clear, it is thought that the effect is achieved, not directly by adsorption of $CO_2$, but by generation of $H_2CO_3$ through reaction of $CO_2$ with a slight amount of water ($H_2O$) remaining in the electrolytic solution. $H_2CO_3$ further changes into $HCO_3^-$ and $CO_3^{2-}$ in some cases. It is thought that these $H_2CO_3$, $HCO_3^-$, and $CO_3^{2-}$ are adsorbed or doped on the surface of polyaniline to suppress further adsorption of $H_2O$, thereby reducing the influence of $H_2O$. This phenomenon can be confirmed as change in an absorption spectrum before and after $CO_2$ purging by Fourier transform infrared spectroscopy (FT-IR) as described later.

The gas introduced into the depressurized atmosphere is preferably gas only containing $CO_2$, but may be gas containing $CO_2$ as a primary component, in other words, gas containing $CO_2$ of 50% or higher with no moisture.

Next, pre-doping of negative electrode 5 will be described. The pre-doping described herein is occlusion of a lithium ion into the carbon material (hard carbon) contained in negative electrode 5 (negative electrode layer 5b) before charging and discharging of the electrochemical device. As described above, after the lithium thin film is formed on negative electrode layer 5b, electrochemical element 1 is housed together with the electrolytic solution in exterior body 2 and left to stand for a predetermined time. Thereby, lithium in the lithium thin film becomes ionized and enters between layers of a crystal structure of the carbon material (hard carbon) contained in negative electrode layer 5b so as to form interlayer compounds of carbon atoms and lithium atoms. Accordingly, a lithium ion is occluded in the carbon material through such a phenomenon, and the pre-doping is completed.

When a lithium ion is occluded in the carbon material contained in negative electrode 5 (negative electrode layer 5b), an electrode potential of negative electrode 5 decreases due to electrochemical reaction of the lithium ion. Accordingly, a potential difference between positive electrode 4 and negative electrode 5 increases, which leads to improved energy density of the electrochemical device.

The pre-doping of a negative electrode is also performed in the field of typical lithium ion secondary batteries. This pre-doping is intended to reduce irreversible capacity of the negative electrode in a charging and discharging cycle to achieve improved charging and discharging capacity. However, the pre-doping of the electrochemical device according to the present disclosure is intended to increase the potential difference between positive electrode 4 and negative electrode 5 due to the potential reduction of negative electrode 5. By the difference in the above intentions, occlusion amounts of lithium ion in the above cases of pre-doping are different with each other. Specifically, the occlusion amount of lithium ion in a typical lithium ion secondary battery only needs to be sufficient for the irreversible capacity of the negative electrode, and thus is clearly smaller than the occlusion amount of lithium ion in the electrochemical device according to the present disclosure. In the present exemplary embodiment, a thickness of the lithium thin film is adjusted so that the occlusion amount is 80% approximately of a maximum occlusion amount capable in the negative electrode. The occlusion amount preferably ranges approximately from 50% to 95%, inclusive.

In the above-described exemplary embodiment, $CO_2$ is purged in any of the first drying step and the second drying step, but the present disclosure is not limited to this configuration. $CO_2$ may be purged only in one of the first and second drying steps. In this case, in the other of the first and second drying steps in which $CO_2$ is not purged, dry air and inert gas are preferably purged for returning to normal pressure. When $CO_2$ is purged, it is preferable to perform heating in a range from 15° C. to 120° C., inclusive. It is thought that, with this configuration, adsorption or doping of $CO_2$ into the conductive polymer is efficiently performed without heat damage on the positive electrode or any other component.

In the above-described exemplary embodiment, the conductive polymer is polyaniline, but the present disclosure is not limited to this configuration. The conductive polymer may be a derivative of polyaniline. Alternatively, any other conductive polymers such as, polypyrrole, polythiophene, polyphenylene, or their derivatives may be used, or a plurality of them that are contained together may be used.

In the above-described exemplary embodiment, hard carbon as a carbon material is used as a negative electrode active material of negative electrode layer 5b, but it is preferable to use a material that electrochemically occludes and releases a lithium ion. For example, the negative electrode active material of negative electrode layer 5b may be a carbon material such as non-graphitizable carbon (hard carbon), graphite, or easily graphitizable carbon (soft carbon), a hydrocarbon material such as polyacene, a metal compound such as silicon oxide or tin oxide, an alloy such as a silicon alloy or a tin alloy, or a ceramics material such as lithium titanate or manganate lithium. These materials may be used alone or in combination of two kinds or more. Among these materials, a carbon material is preferable because it achieves low potential of the negative electrode.

In the above-described exemplary embodiment, the conductive polymer is directly deposited on current collector 4a through electrolytic polymerization, but the present disclosure is not limited to this configuration. A conductive polymer formed in advance through electrolytic polymerization or chemical polymerization may be applied and formed on current collector 4a. In this case, a mixture of, for example, conduction agent and binding agent can be applied together with the conductive polymer, and the positive electrode layer is formed of their composite.

In the above-described exemplary embodiment, the mixture of electrolyte such as $LiPF_6$ and a solvent obtained by mixing PC and DMC at a weight ratio of 1:1 is used as the electrolytic solution, but the present disclosure is not limited to this configuration. Specifically, the electrolyte may be a material that contains a lithium ion as a cation and any other anion, such as $LiClO_4$, $LiBF_4$, or $LiAsF_6$. The solvent used for the electrolytic solution may include cyclic carbonate, chain carbonate, cyclic ester, chain ester, cyclic ether, chain ether, or an organic solvent containing an epoxy group, a sulfone group, a vinyl group, a carbonyl group, an amide group, or a cyano group. And it may be used by selecting (mixing) one kind, two kinds, or more from among ethylene carbonate, gamma butyrolactone, sulfolane, ethyl methyl carbonate, diethyl carbonate, and butylene carbonate as appropriate.

In the above-described exemplary embodiment, the lithium thin film is formed on negative electrode layer 5b by vacuum evaporation coating, but the present disclosure is not limited to this configuration. Lithium foil formed by pressure rolling may be disposed on negative electrode layer 5b.

In the above-described exemplary embodiment, electrochemical element 1 has a configuration in which a laminated body of positive electrode 4, negative electrode 5, and separator 6 is wound, but may have a configuration in which positive electrode 4, negative electrode 5, and separator 6 are only laminated. The exterior body 2 may have a configuration in which circumferences of two sheets are closely contacted with each other to seal inside, what is called a laminate structure.

In the above-described exemplary embodiment, since the conductive polymer is directly deposited on current collector 4a by electrolytic polymerization, positive electrode layer 4b contains no binder nor binding material but only contains the conductive polymer. Contrast to this, under a conventional manufacturing condition, a large amount of water is likely to be adsorbed into positive electrode layer 4b. In the above-described exemplary embodiment, cellulose, which is likely to adsorb water, is used as the material of separator 6. In the case of an electrochemical device having a configuration with which water is likely to be adsorbed, characteristic degradation is more likely to occur. Thus, the present disclosure is effective particularly for such a configuration to which water adsorption is likely to occur.

The shape, material, formation method, and fabrication method for any other component may be changed as appropriate without departing from the scope of the present disclosure.

EXAMPLES

The present disclosure will be described further in detail based on examples.

Experiment 1

Three cells (cell A1, cell B1, and cell X1) were produced to evaluate effects of the $CO_2$ purge in the first drying step and the second drying step described above. The configurations and production methods of the three cells are identical to each other unless otherwise stated in the following description.

[Production of Positive Electrode]

An Al foil having a plane shape of 2 cm×2 cm was used as a positive electrode collector (the first current collector). Polyaniline was synthesized on front and back surfaces of the Al foil by a galvanostatic electrolytic polymerization method using an aqueous solution containing an aniline monomer of 1 mol/l and sulfuric acid of 2 mol/l as electrolytic polymerization liquid. After the electrolytic polymerization, the Al foil was cleaned with distilled water and dried so as to form positive electrode layers on the front and back surfaces of the Al foil. Each of positive electrode layers had a thickness of 60 μm.

Subsequently, a part of each of positive electrode layers was removed to expose the Al foil, and an Al tab lead was attached onto the exposed region of the Al foil by ultrasonic welding. Thereafter, a drying step of heating the Al foil to 100° C. in a vacuum container and holding the Al foil in the container for 12 hours was performed. Then, the atmosphere in the container was returned to room temperature and normal pressure by purging with different gasses at 100° C. Specifically, the purging gas for cell A1 was $CO_2$, and the purging gas for each of cell B1 and cell X1 was dry air having a dew point of −40° C. or lower.

[Production of Negative Electrode]

A Cu foil having a plane shape of 2 cm×2 cm was used as a negative electrode collector (the second current collector). Carbon paste was produced by kneading a mixed powder and water at a weight ratio of 40:60. The mixed powder is a mixture of hard carbon of 97 wt %, carboxyl methyl cellulose of 1 wt %, and styrene butadiene rubber of 2 wt. And then the carbon paste was applied on one surface of the Cu foil and dried to form a negative electrode layer having a thickness of 35 μm.

Thereafter, a drying step of heating the Cu foil to 110° C. in a vacuum container and holding the Cu foil for 12 hours was performed. Then, the atmosphere in the container was returned to room temperature and returned to normal pressure by purging with dry air having a dew point of −40° C. or lower. In addition, a lithium thin film was formed on the entire surface of the negative electrode layer by vacuum evaporation coating. Subsequently, a part of the negative electrode layer and the lithium thin film was removed to expose the Cu foil, and a Ni tab lead was attached onto the exposed region of the Cu foil by resistance welding.

[Production of Separator]

The separator was produced as follows. A cellulose sheet having a thickness of 35 μm was cut out into a predetermined size and provided with a drying step of heating the cellulose sheet to 110° C. in a vacuum container and holding the cellulose sheet for 12 hours. Thereafter, the atmosphere in the container was returned to room temperature and returned to normal pressure by purging with dry air having a dew point of −40° C. or lower.

[Production of Electrolytic Solution]

Vinylene carbonate (VC) of 0.2 wt % was added to a solution obtained by mixing propylene carbonate (PC) and dimethyl carbonate (DMC) at a weight ratio of 1:1. This mixture was used as a solvent for a solution containing $LiPF_6$ of 1 mol/l as electrolyte, thereby obtaining an electrolytic solution.

[Production of Electrochemical Element]

An electrochemical element was produced by laminating the positive electrode, the negative electrode, and the separator such that the positive electrode layer and the negative electrode layer faces to each other with the separator interposed between the positive electrode layer and the negative electrode layer. In other words, the positive electrode, the negative electrode, and the separator were laminated in an order of the negative electrode, the separator, the positive electrode, the separator, and the negative electrode.

[Production of Cell]

The electrochemical element was inserted into an exterior body composed of two Al laminate sheets sealed to each other at three sides in advance. Subsequently, a drying step of holding the exterior body for 30 minutes at room temperature in a vacuum container was performed, and then the atmosphere in the container was returned to normal pressure by purging with different gasses. Specifically, the purging gas for each of cell A1 and cell B1 was $CO_2$, and the purging gas for cell X1 was dry air having a dew point of −40° C. or lower.

Thereafter, the exterior body was filled with the electrolytic solution, and the entire electrochemical element was impregnated with the electrolytic solution by holding the exterior body filled with the electrolytic solution in depressurized atmosphere. Lastly, an atmosphere surrounding the exterior body was returned to normal pressure by purging with dry air having a dew point of −40° C. or lower. In addition, the remaining one side of exterior body was sealed so as to insulate the two tab leads from the exterior body. In this manner, cells A1, B1, and X1 were produced.

Subsequently, the produced cells were evaluated as follows.

[IR Measurement]

The produced cells were each charged to 3.0 V at a current value (10 C), which is ten times greater than current capacity, and then kept at the constant voltage of 3.0 V for 30 minutes. Thereafter, the electrochemical element was taken out of the exterior body under atmosphere having a dew point of −40° C. or lower, and disassembled into the positive electrode, the negative electrode, and the separator. Then, the positive electrode was cleaned with DMC to remove any electrolytic solution component. The positive electrode thus processed was vacuum-dried to remove the DMC, and then analysis was performed on the positive electrode layer of each cell by FT-IR. The FT-IR measurement was performed by an ATR method.

Figure 2:
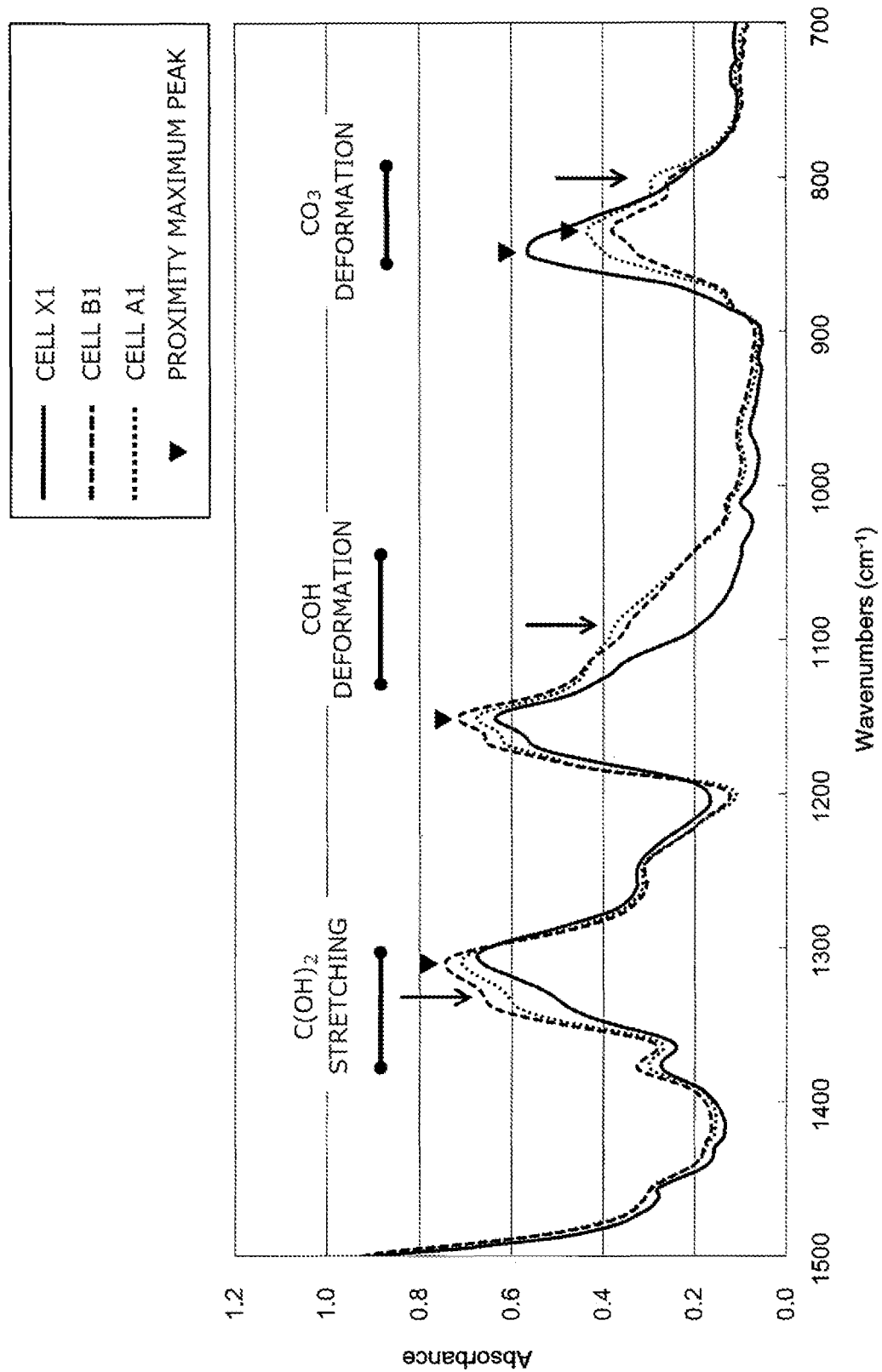
FIG. 2 shows a FT-IR spectrum measured for a positive electrode layer of each cell.

FIG. 2 shows a FT-IR spectrum measured for the positive electrode layer of each cell. As for cells A1 and B1, an absorbance ($A_{800}$) at 800 cm$^{-1}$, an absorbance ($B_{1085}$) at 1085 cm$^{-1}$, and an absorbance ($C_{1340}$) at 1340 cm$^{-1}$ are increased as compared to cell X1 as indicated with arrows in FIG. 2. Absorption at 800 cm$^{-1}$ indicates deformation vibration of $CO_3$, absorption at 1085 cm$^{-1}$ indicates deformation vibration of COH, and absorption at 1340 cm$^{-1}$ indicates stretching vibration of $C(OH)_2$. Thus, as for cells A1 and B1, it is thought that at least one of $H_2CO_3$, $HCO_3^-$, and $CO_3^{2-}$ as derivatives of $CO_2$ is adsorbed or doped on the surface of polyaniline in the positive electrode layer by purging with $CO_2$.

A ratio ($A_{800}/A_{max}$) of $A_{800}$ to a proximity peak absorbance ($A_{max}$) near 800 cm$^{-1}$, a ratio ($B_{1085}/B_{max}$) of $B_{1085}$ to a proximity peak absorbance ($B_{max}$) near 1085 cm$^{-1}$, and a ratio ($C_{1340}/C_{max}$) of $C_{1340}$ to a proximity peak absorbance ($C_{max}$) near 1340 cm$^{-1}$ were calculated for each cell. Each position of main proximity peaks was indicated with black triangles in FIG. 2. Specifically, a proximity peak near 800 cm$^{-1}$ is a peak having a maximum absorbance among absorption peaks appearing between 700 cm$^{-1}$ to 900 cm$^{-1}$. A proximity peak near 1085 cm$^{-1}$ is a peak having a maximum absorbance among absorption peaks appearing between 900 cm$^{-1}$ to 1200 cm$^{-1}$. A proximity peak near 1340 cm$^{-1}$ is a peak having a maximum absorbance among absorption peaks appearing between 1200 cm$^{-1}$ to 1400 cm$^{-1}$. Table 1 lists the above-described absorbance ratios of each cell.

TABLE 1

| Absorbance ratio | Cell A1 | Cell B1 | Cell X1 |
|---|---|---|---|
| $A_{800}/A_{max}$ | 0.55 | 0.57 | 0.30 |
| $B_{1085}/B_{max}$ | 0.41 | 0.49 | 0.21 |
| $C_{1340}/C_{max}$ | 0.86 | 0.83 | 0.70 |

As table 1 shows, the three absorbance ratios for cells A1 and B1 are greater than the three absorbance ratios for cell X1. In other words, by purging with $CO_2$, $A_{800}/A_{max}$ is greater than 0.30, $B_{1085}/B_{max}$ is larger than 0.21, and $C_{1340}/C_{max}$ is greater than 0.70.

Experiment 2

Figure 3A:
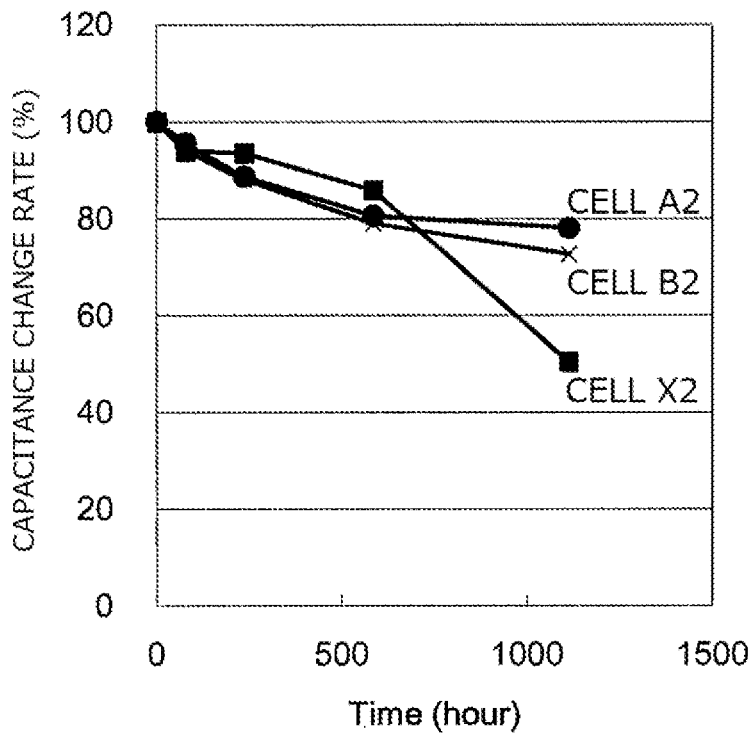
FIG. 3A is a graph showing a capacitance change rate with regard to each of cells A2, B2, and X2 in a float test.
Figure 3B:
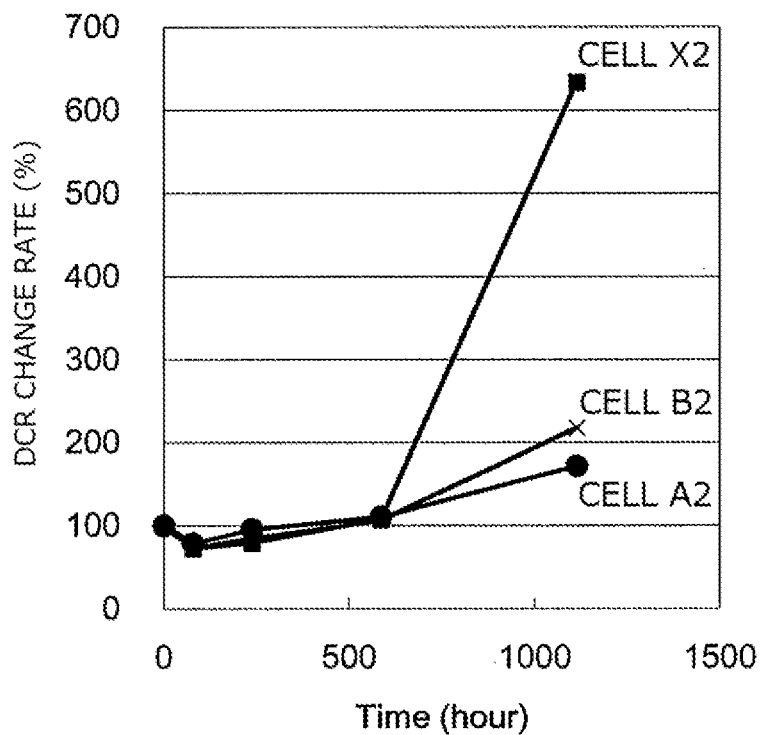
FIG. 3B is a graph showing a direct-current resistance change rate with regard to each of cells A2, B2, and X2 in a float test.
Figure 3C:
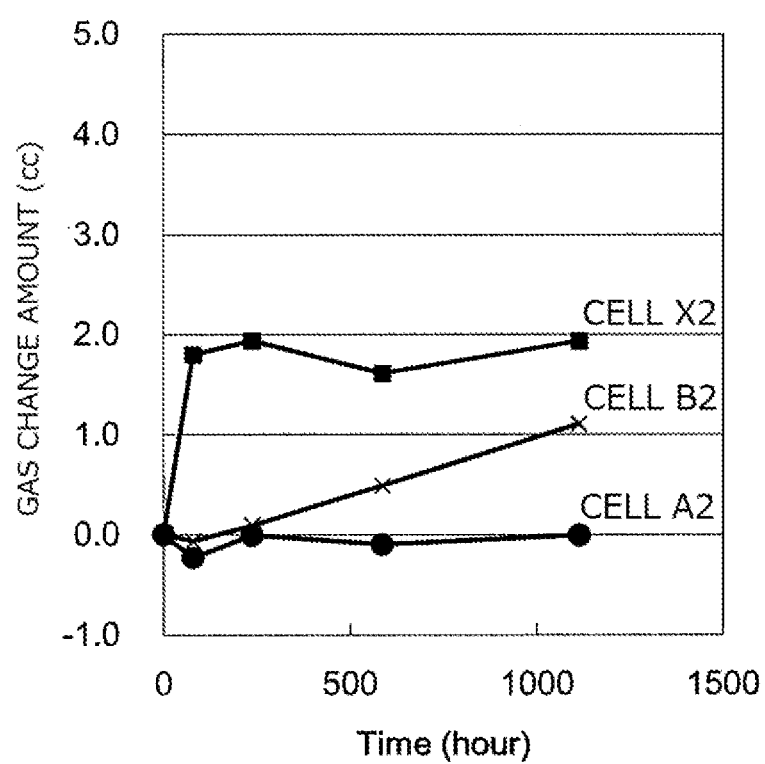
FIG. 3C is a graph showing a gas change amount with regard to each of cells A2, B2, and X2 in a float test.

Next, cells A2, B2, and X2 same as cells A1, B1, and X1, respectively, were produced in which the size of the positive electrode and the negative electrode in Experiment 1 was changed from the plane shape of 2 cm×2 cm to a plane shape of 4 cm×5 cm. While a voltage of 3.5 V was applied to the produced cells at 60° C., a float test was performed to evaluate a change rate of capacitance (electrostatic capacitance), a change rate of direct-current resistance, and a change amount (generation amount) of gas inside the exterior body with time elapse. FIGS. 3A to 3C show results of the float test.

FIG. 3A is a graph showing a capacitance change rate with regard to each of cells A2, B2, and X2 in a float test. FIG. 3B is a graph showing a direct-current resistance change rate with regard to each of cells A2, B2, and X2 in a float test. FIG. 3C is a graph showing a gas change amount with regard to each of cells A2, B2, and X2 in a float test. At cell X2, the capacitance decreased (ΔC decreased) and the direct-current resistance increased (ΔDCR increased) as time elapsed. Contrast to this, at cells A2 and B2, the capacitance and the direct-current resistance were relatively stable with small change rates as time elapsed. As for the gas generation amount, at cell X2, a large amount of gas was generated immediately after start of the test. Contrast to this, at cell A2, almost no change occurred (no gas was generated), and at cell B2, the gas generation was suppressed as compared to cell X2 although gas increased with time. This indicates that each characteristic is stabilized by purging with $CO_2$ when the positive electrode or the electrochemical element is dried, thereby improving reliability.

Experiment 3

Figure 4A:
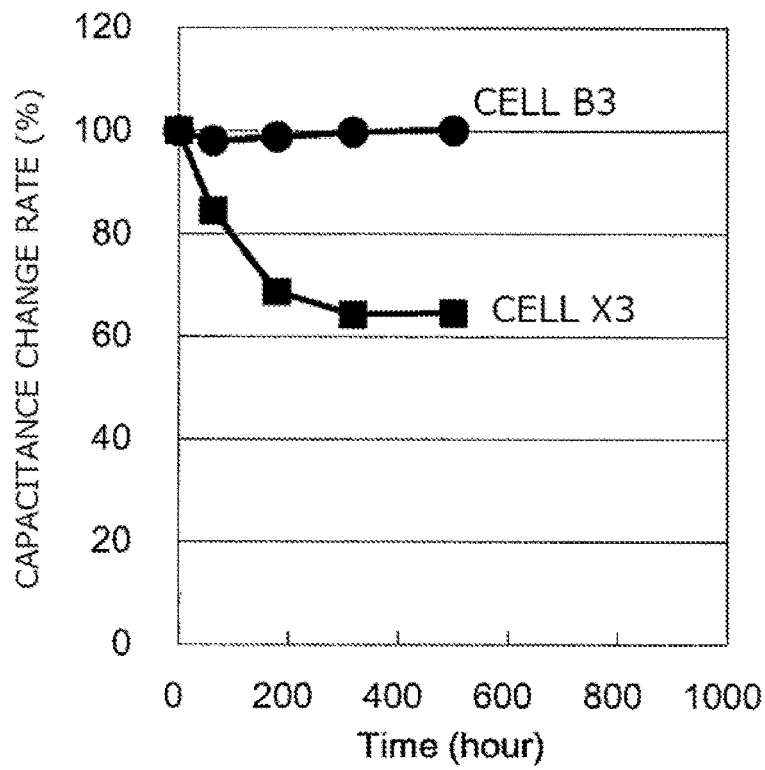
FIG. 4A is a graph showing a capacitance change rate with regard to each of cells B3 and X3 in a float test.
Figure 4B:
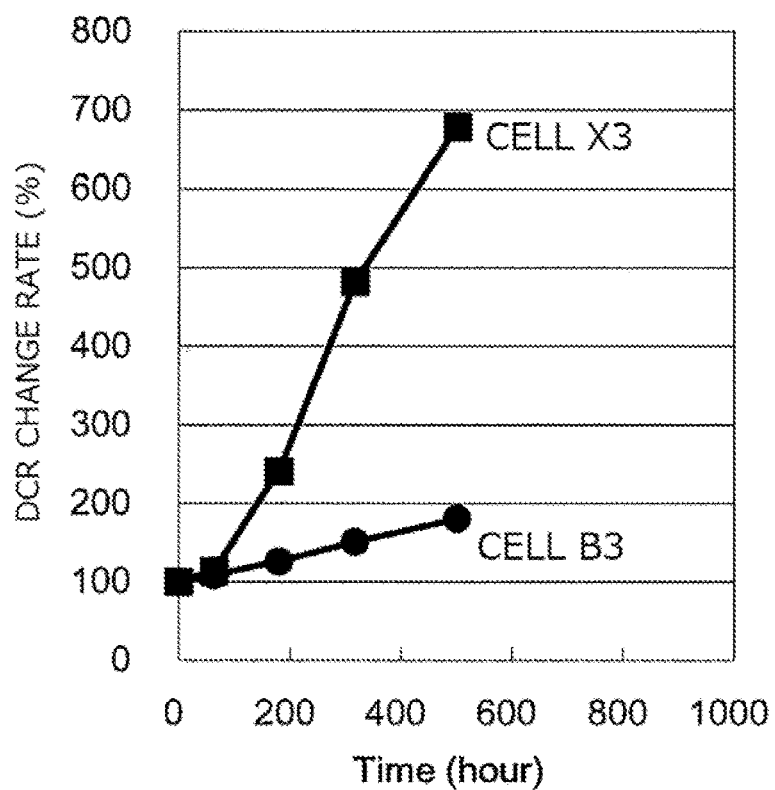
FIG. 4B is a graph showing a direct-current resistance change rate with regard to each of cells B3 and X3 in a float test.
Figure 4C:
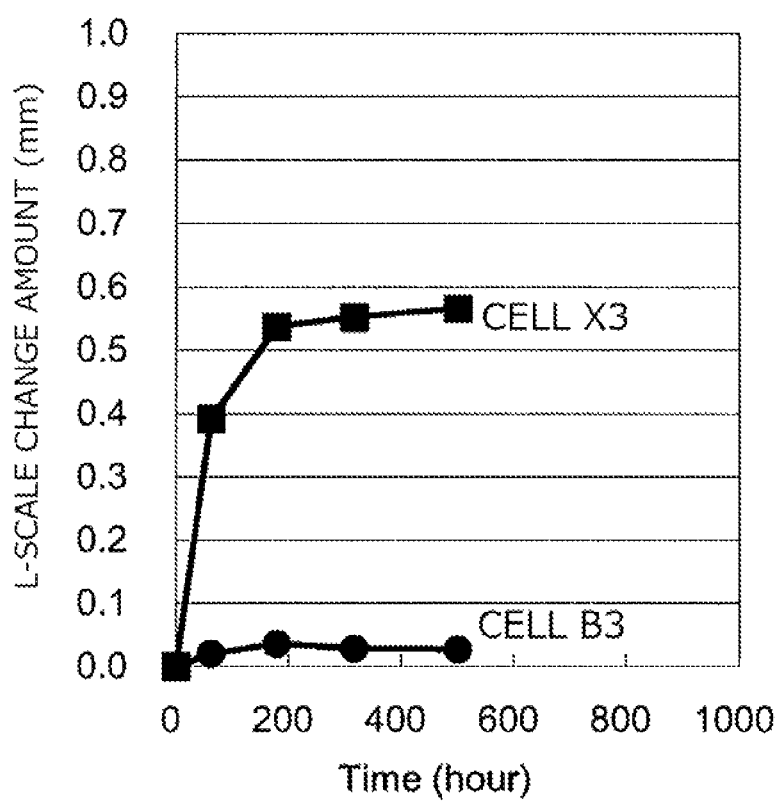
FIG. 4C is a graph showing an L-scale change amount with regard to each of cells B3 and X3 in a float test.

Subsequently, a wound-type cell described in the above-described exemplary embodiment was produced, and a float test same as the float test in Experiment 2 was performed. Similarly to the above-described exemplary embodiment except that soft carbon was used as the carbon material of the negative electrode layer, an electrochemical element was produced and sealed in an exterior body having a diameter of 1.25 cm and a length of 4 cm. Any other production conditions of the positive electrode and the negative electrode were same as production conditions in Experiment 1. Cell B3 was produced by purging the electrochemical element with $CO_2$ after drying (purging the positive electrode with dry air after drying), and cell X3 was produced by purging the positive electrode and the electrochemical element with dry air after drying. Similarly to Experiment 2, a float test was performed on the two cells. FIGS. 4A to 4C show results of the float test.

FIG. 4A is a graph showing a capacitance change rate with regard to each of cells B3 and X3 in a float test. FIG. 4B is a graph showing a direct-current resistance change rate with regard to each of cells B3 and X3 in a float test. FIG. 4C is a graph showing an L-scale change amount with regard to each of cells B3 and X3 in a float test. Here, the L-scale change amount is a change amount of the length in the longitudinal direction of the exterior body, and is a value that varies along with the change amount of the gas generated in the exterior body. Similarly to FIGS. 3A to 3C, at cell X3, the capacitance decreased (ΔC decreased) and the direct-current resistance increased (ΔDCR increased) as time elapsed Contrast to this, at cell B3, the capacitance and the direct-current resistance were relatively stable with small change ratios as time elapsed. As for the gas generation amount, at cell X3, a large amount of gas was generated (the L-scale change amount is greatly increased) immediately after start of the test. Contrast to this, at cell B3, almost no change occurred. Thus the gas generation at cell B3 was suppressed as compared to cell X3. It was confirmed from this result that each characteristic is stabilized by purging with $CO_2$ when the electrochemical element is dried, thereby improving reliability.

The electrochemical device according to the present disclosure has an excellent characteristic at rapid charging and discharging, and is useful as, for example, a hybrid-vehicle power source used for regeneration and backup.

What is claimed is:

1. An electrochemical device comprising:
a positive electrode including a first current collector and a positive electrode layer containing a conductive polymer;
a negative electrode including a second current collector and a negative electrode layer; and
an electrolytic solution, wherein:
an absorption spectrum for the positive electrode layer which is measured by infrared spectroscopy has a profile that a ratio of an absorbance at 800 $cm^{-1}$ to a proximity peak absorbance near 800 $cm^{-1}$ is greater than 0.30, a ratio of an absorbance at 1085 $cm^{-1}$ to a proximity peak absorbance near 1085 $cm^{-1}$ is greater than 0.21, and a ratio of an absorbance at 1340 $cm^{-1}$ to a proximity peak absorbance near 1340 $cm^{-1}$ is greater than 0.70, and
the profile of the absorption spectrum has upward protrusions at 800 $cm^{-1}$, 1085 $cm^{-1}$, and 1340 $cm^{-1}$, respectively,
the upward protrusions at 800 $cm^{-1}$, 1085 $cm^{-1}$, and 1340 $cm^{-1}$ are caused by absorption or doping of at least one selected from the group consisting of $H_2CO_3$, $HCO_3^-$, and $CO_3^{2-}$ as derivatives of $CO_2$ into the conductive polymer, and
the conductive polymer contains polyaniline or a derivative of polyaniline.

2. The electrochemical device according to claim 1, further comprises a separator interposed between the positive electrode and the negative electrode, wherein:
the negative electrode layer contains a material configured to occlude and release a lithium ion, and
the electrolytic solution contains a lithium ion and an anion.

3. An electrochemical device comprising:
a positive electrode including a first current collector and a positive electrode layer containing a conductive polymer;
a negative electrode including a second current collector and a negative electrode layer; and
an electrolytic solution, wherein:
an absorption spectrum for the positive electrode layer which is measured by infrared spectroscopy has a profile that a ratio of an absorbance at 800 $cm^{-1}$ to a proximity peak absorbance near 800 $cm^{-1}$ is greater than 0.30, a ratio of an absorbance at 1085 $cm^{-1}$ to a proximity peak absorbance near 1085 $cm^{-1}$ is greater than 0.21, and a ratio of an absorbance at 1340 $cm^{-1}$ to a proximity peak absorbance near 1340 $cm^{-1}$ is greater than 0.70, and
at least one selected from the group consisting of $H_2CO_3$, $HCO_3^-$, and $CO_3^{2-}$ as derivatives of $CO_2$ is adsorbed or doped in the conductive polymer.

4. The electrochemical device according to claim 3, further comprises a separator interposed between the positive electrode and the negative electrode, wherein:
the negative electrode layer contains a material configured to occlude and release a lithium ion, and
the electrolytic solution contains a lithium ion and an anion.

5. The electrochemical device according to claim 3, wherein the conductive polymer contains polyaniline or a derivative of polyaniline.

6. The electrochemical device according to claim 4, wherein the conductive polymer contains polyaniline or a derivative of polyaniline.

7. An electrochemical device comprising:
a positive electrode including a first current collector and a positive electrode layer containing a conductive polymer;
a negative electrode including a second current collector and a negative electrode layer; and
an electrolytic solution, wherein:
at least one selected from the group consisting of $H_2CO_3$, $HCO_3^-$, and $CO_3^{2-}$ as derivatives of $CO_2$ is adsorbed or doped in the conductive polymer, and
a profile of an absorption spectrum for the positive electrode layer which is measured by infrared spectroscopy has upward protrusions at 800 $cm^{-1}$, 1085 $cm^{-1}$, and 1340 $cm^{-1}$, respectively.

8. The electrochemical device according to claim 7, wherein the conductive polymer contains polyaniline or a derivative of polyaniline.

9. The electrochemical device according to claim 7, further comprises a separator interposed between the positive electrode and the negative electrode, wherein:
the negative electrode layer contains a material configured to occlude and release a lithium ion, and
the electrolytic solution contains a lithium ion and an anion.

* * * * *